United States Patent
Tang et al.

[11] Patent Number: 6,083,403
[45] Date of Patent: Jul. 4, 2000

[54] STABILIZED SUBSTITUTED AMINOMETHANE-1, 1-DIPHOSPHONIC ACID N-OXIDES AND USE THEREOF IN PREVENTING SCALE AND CORROSION

[75] Inventors: Jiansheng Tang, Sudbury, Mass.; Michael A. Kamrath, Aurora, Ill.

[73] Assignee: Nalco Chemical Company, Naperville, Ill.

[21] Appl. No.: 09/186,592

[22] Filed: Nov. 5, 1998

[51] Int. Cl.[7] .................................................. C02F 5/14
[52] U.S. Cl. .................. 210/700; 210/764; 252/180; 252/389.22; 422/15; 562/13
[58] Field of Search ................... 210/699, 700, 210/764; 252/180, 389.21, 389.22; 422/15; 562/12–14

[56] References Cited

U.S. PATENT DOCUMENTS

| | | | |
|---|---|---|---|
| 3,470,243 | 9/1969 | Crutchfield et al. | 260/502.5 |
| 3,617,576 | 11/1971 | Kerst | 210/699 |
| 3,957,160 | 5/1976 | Plöger et al. | 210/700 |
| 3,979,385 | 9/1976 | Wollmann et al. | 260/247 |
| 4,088,678 | 5/1978 | Matt et al. | 210/699 |
| 4,246,103 | 1/1981 | Block et al. | 210/699 |
| 4,892,679 | 1/1990 | Blum et al. | 562/21 |
| 4,973,744 | 11/1990 | Hwa et al. | 562/12 |
| 5,051,532 | 9/1991 | Hwa et al. | 562/12 |
| 5,093,005 | 3/1992 | Greaves | 210/700 |
| 5,096,595 | 3/1992 | Hwa et al. | 210/700 |
| 5,167,866 | 12/1992 | Hwa et al. | 210/700 |
| 5,259,974 | 11/1993 | Chen et al. | 210/700 |
| 5,414,112 | 5/1995 | Dragisich | 562/12 |
| 5,478,476 | 12/1995 | Dragisich | 210/700 |
| 5,772,893 | 6/1998 | Reed et al. | 210/699 |
| 5,788,857 | 8/1998 | Yang et al. | 210/700 |

OTHER PUBLICATIONS

NACE Corrosion/93, paper No. 266 (1993), "A Vovel Non–Heavy Metal Cooling Water Treatment Effective Under Stagnant or Low Flow Conditions", D. Hartwick, J. Chalut and V. Jovancicevic.

NACE Corrosion/94, paper No. 517 (1994), "Characterization of Pitting Corrosion on Refinery Heat Exchangers", D. Hartwick, J. Richardson, V. Jovancicevic and M. Peters.

Primary Examiner—Peter A. Hruskoci
Attorney, Agent, or Firm—Michael B. Martin; Thomas M. Breininger

[57] ABSTRACT

This invention relates to novel organic phosphonate compounds which can be used as water treatment agents. More specifically, this invention relates to 1,1 -diphosphonic acid N-oxides and water-soluble salts thereof for control of corrosion and scale in aqueous systems. Preferred N-oxides are morpholinomethane-1,1-diphosphonic acid N-oxide and N,N-dimethylaminomethane-1,1-diphosphonic acid N-oxide.

12 Claims, No Drawings

STABILIZED SUBSTITUTED AMINOMETHANE-1, 1-DIPHOSPHONIC ACID N-OXIDES AND USE THEREOF IN PREVENTING SCALE AND CORROSION

FIELD OF THE INVENTION

This invention relates to novel organic phosphonate compounds which can be used as water treatment agents. More specifically, this invention relates to 1,1-diphosphonic acid N-oxides and water-soluble salts thereof for control of corrosion and scale in aqueous systems. Preferred N-oxides are morpholinomethane-1,1-diphosphonic acid N-oxide and N,N-dimethylaminomethane-1,1-diphosphonic acid N-oxide.

BACKGROUND OF THE INVENTION

Many industrial waters tend to be corrosive. Such waters, when in contact with a variety of metal surfaces such as ferrous metals, aluminum, copper and its alloys, tend to corrode one or more of such metals or alloys.

Ferrous metals such as carbon steel are among the most commonly used structural materials in industrial systems. It is generally known that in industrial systems having a ferrous metal in contact with an aqueous solution, corrosion (both general and localized corrosion) of the metal is one of the major problems. Loss of the metals from surfaces resulting from general corrosion causes deterioration of the structural integrity of the system or structure because of reduction of mechanical strength. It can also cause problems such as underdeposit corrosion, increased heat transfer resistance, or even blockage of the flow lines in other parts of the system due to the transport and accumulation of corrosion products in areas with low flow rates or geometric limitations. Localized corrosion (e.g., pitting ) may pose an even greater threat to the normal operation of the system than general corrosion because such corrosion will occur intensely in one particular location and may cause perforations in the system structure carrying an industrial water stream. Obviously, these perforations may cause leaks which require shutdown of the entire industrial system so that repair can be made. Indeed, corrosion problems usually result in immense maintenance costs, as well as costs incurred as a result of equipment failure. Therefore, the inhibition of metal corrosion in industrial water is critical.

Corrosion protection of ferrous metals in industrial water systems is often achieved by adding a corrosion inhibitor. Many corrosion inhibitors, including chromate, molybdate, zinc, nitrite, orthophosphate, and polyphosphate have been used previously, alone or in combination, in various chemical treatment formulations. However, these inorganic chemicals are either toxic and detrimental to the environment, or are not very effective against localized corrosion, especially at economically feasible and/or environmentally acceptable low dosage levels, although they can usually provide satisfactory protection against general corrosion (e.g., corrosion rate $\leq 3$ mpy). Some organic phosphonates, such as 2-phosphonobutane-1,2,4-tricarboxylic acid (PBTC), 1-hydroxyethylidene-1,1-diphosphonic acid (HEDP) and aminotrimethylenephosphonic acid (AMP) have been used previously as corrosion inhibitors, alone or in combination with other corrosion inhibitors, in various chemical treatment formulations. However, the effectiveness of these phosphonate based treatments is generally significantly lower than the treatments based on inorganic inhibitors.

U.S. Pat. No. 5,167,866 discloses that certain phosphonomethyl amine oxides can be used as scale and corrosion inhibitors in aqueous systems. In subsequent publications [D. Hartwick, J. Chalut and V. Jovancicevic, Corrosion/93, paper no. 266, NACE, (1993); D. Hartwick, J. Richardson, V. Jovancicevic and M. Peters, Corrosion/94, paper no. 517, NACE, (1994)], ethanolamine bisphosphonomethyl N-oxide (EBO) was further identified to be a particularly effective pitting inhibitor. Nevertheless, the concentrations needed to obtain sufficient inhibition still appear to be prohibitively high (e.g., >50mg/l EBO is needed to obtain an anodic inhibition efficiency of greater than 40%).

Scale build-up is another serious problem in industrial water systems. The build-up of deposit (scales) interferes with heat transfer, e.g., from the inside surface of a heat exchanger tube (i.e.- the process side) to the cooling medium such as water. The reduction of the rate of heat transfer occurs because the scales formed generally have a lower heat transfer coefficient than the metal tube itself. Thus, scaling reduces the efficiency of the system. Further, scaling and deposits can lead to corrosion underneath the deposits on the metallic surface and reduce the useful life of the equipment. Calcium carbonate or sulfate as well as iron oxides and hydroxides generated in the corrosion process are some of the most commonly observed scale formers in industrial water systems.

The utilization of water which contains certain inorganic impurities, and the production and processing of crude oil/water mixtures containing such impurities, is plagued by the precipitation of these impurities with subsequent scale formation. In the case of water which contains these contaminants, the harmful effects of scale formation are generally confined to the reduction of the capacity or bore of receptacles and conduits employed to store and convey the contaminated water. In the case of conduits, the impedance of flow is an obvious consequence. However, a number of equally consequential problems are realized in specific utilizations of contaminated water. For example, scale formed upon the surfaces of storage vessels and conveying lines for process water may break loose and these large masses of deposit can be entrained in and conveyed by the process water to damage and clog equipment through which the water is passed, e.g., tubes, valves, filters and screens. In addition, these crystalline deposits may appear in, and detract from, the final product which is derived from the process, e.g., paper formed from an aqueous suspension of pulp. Furthermore, when the contaminated water is involved in a heat exchange process, as either the "hot" or "cold" medium, scale will be formed upon the heat exchange surfaces which are contacted by the water. Such scale formation forms an insulating or thermal pacifying barrier which impairs heat transfer efficiency as well as impeding flow through the system.

Most industrial waters contain alkaline earth metal cations, such as calcium, barium, magnesium, etc. and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction products, a solid phase of calcium carbonate will form. Calcium carbonate is the most common form of scale.

Solubility product concentrations are exceeded for various reasons, such as partial evaporation of the water phase, change in pH, pressure or temperature, and the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes and harbors bacteria. This scale is an expensive problem in many industrial water systems causing delays and shutdowns for cleaning and removal.

Scale deposits are generated and extended principally by means of crystal growth; and various approaches to reducing scale development have accordingly included inhibition of crystal growth, modification of crystal growth and dispersion of the scale-forming minerals.

While calcium sulfate and calcium carbonate are primary contributors to scale formation, other salts of alkaline-earth metals and the aluminum silicates are also offenders, e.g., magnesium carbonate, barium sulfate, and the aluminum silicates provided by silts of the bentonitic, illitic, and kaolinitic types among others.

Numerous compounds have been added to these industrial waters in an attempt to prevent or reduce scale and corrosion, such as low molecular weight poly(acrylic acid) polymers. Another class of compounds are the well known organophosphonates which are illustrated by the compounds hydroxyethylidene diphosphonic acid (HEDP) and phosphonobutane tricarboxylic acid (PBTC). Another group of active scale and corrosion inhibitors are the monosodium phosphinico(bis) succinic acids which are described in U.S. Pat. No. 4,088,678.

Many organophosphorus compounds have been disclosed as scale inhibitors. For example, N,N-bis(phosphonomethyl)-2-amino-1-propanol and derivatives are disclosed in U.S. Pat. No. 5,259,974; ether diphosphonates are disclosed in U.S. Pat. No. 5,772,893; N-substituted aminoalkane-1,1-diphosphonic acids are disclosed in U.S. Pat. No. 3,957,160; and propane-1,3-disphosphonic acids are disclosed in U.S. Pat. No. 4,246,103. Further, N-bis(phosphonomethyl) amino acids for the prevention of calcium carbonate scale are disclosed in U.S. Pat. Nos. 5,414,112 and 5,478,476. 1,1-diphosphonic acid compounds are disclosed in U.S. Pat. Nos. 3,617,576 and 4,892,679.

Hydroxyimino alkylene phosphonic acids are disclosed in U.S. Pat. No. 5,788,857. Furthermore, there are several references to the use of N,N-bis-phosphonomethyl N-oxides such as the ethoxylated N,N-bis-phosphonomethyl 2-(hydroxy)ethylamine N-oxides in U.S. Pat. No. 4,973,744; N,N-bis(phosphonomethyl)-2-amino-1-propanol N-oxide in U.S. Pat. No. 5,259,974; oxidized tertiary amines in U.S. Pat. Nos. 5,096,595 and 5,167,866; N,N-bis-phosphonomethyl taurine N-oxide in U.S. Pat. No. 5,051,532; and tetrakis(dihydrogen phosphonomethyl)ethylene diamine N,N-dioxides in U.S. Pat. No. 3,470,243. However, these compounds are structurally different from those 1,1-diphosphonic acid N-oxides described herein, in that these compounds are 1,3-diphosphonic acid 2-N-oxides, while the compounds of the instant invention are 1,1-diphosphonic acid-1-N-oxides. As will be seen from examples which follow, these structural differences lead to superior anti-scale and anti-corrosion characteristics.

Apparently, there is a need for a corrosion inhibitor that can effectively prevent both general corrosion and localized (e.g., pitting) corrosion of ferrous metals and can also efficiently prevent scale formation on metallic surfaces in contact with the waters of various systems, such as industrial process waters.

Among the objectives of this invention are: to provide a family of N-alkylene-1,1-diphosphonic acid-1-N-oxides that can effectively provide inhibition of localized (pitting) corrosion of ferrous metals in contact with such systems; to provide a family of N-alkylene-1,1-diphosphonic acid-1-N-oxides that can efficiently reduce general corrosion of ferrous metals in contact with such systems; to provide a family of N-alkylene-1,1-diphosphonic acid-1-N-oxides that can efficiently prevent scale formation on metallic surfaces in contact with such systems; to provide a family of N-alkylene-1,1-diphosphonic acid-1-N-oxides that can simultaneously prevent localized corrosion, general corrosion of ferrous metals, and scale formation on metallic surfaces in such systems, and to provide a family of N-alkylene-1,1-diphosphonic acid-1-N-oxides which are biocide stable and calcium tolerant.

SUMMARY OF THE INVENTION

This invention relates to novel organic phosphonate compounds which can be used as water treatment agents. More specifically, this invention relates to 1,1-diphosphonic acid N-oxides and water-soluble salts thereof for control of corrosion and scale in aqueous systems. Preferred N-oxides are morpholinomethane-1,1-diphosphonic acid N-oxide and N,N-dimethylaminomethane-1,1-diphosphonic acid N-oxide.

DESCRIPTION OF THE INVENTION

The Phosphonic Acid N-Oxides

The following general formulae represent useful N-oxides for the practice of this invention: general formula I:

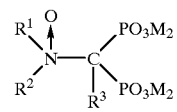

general formula II:

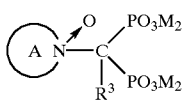

general formula III:

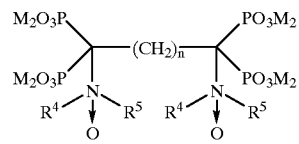

and general formula IV:

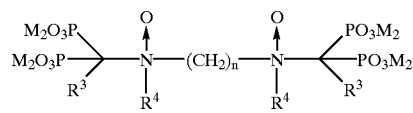

Examples of compounds represented by formula I include the following and their water-soluble salts:

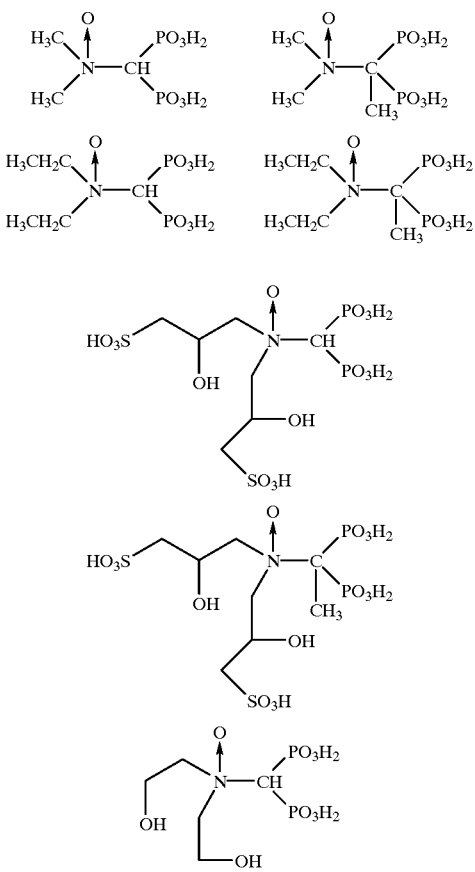

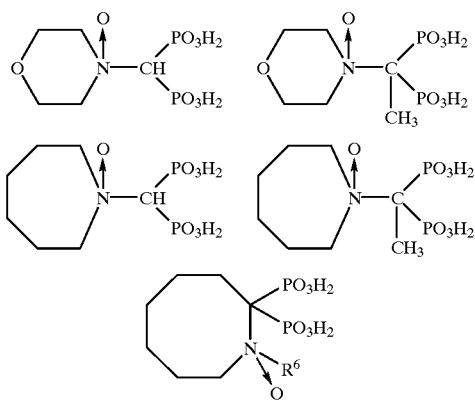

The N-oxide of formula I may be N,N-dimethylaminomethane-1,1-diphosphonic acid N-oxide and its water-soluble salts.

Examples of compounds represented by formula II include the following, and their water-soluble salts:

$R^6$ may be defined as a straight chain alkyl group, branched chain alkyl group, alcohol, ether, thioether, amine, ester, amide or carboxylic acid.

The N-oxide of formula II may be morpholinomethane-1,1-diphosphonic acid N-oxide and its water soluble salts.

Among the suitable nitrogen heterocycles are pyrrolidine, piperidine, quinuclidine, 1-azabicyclo [2,2,1]heptane and substituted derivatives thereof.

One aspect of the invention is a method for preventing scale formation on metal surfaces in contact with scale-forming industrial water within an industrial system which comprises the step of treating said water with an effective scale-inhibiting amount of a water-soluble 1,1-diphosphonic acid N-oxide selected from the group consisting of:

compounds of formula (I):

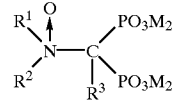

wherein $R^1$ and $R^2$ are selected from the group consisting of: straight chained alkyl groups, branched alkyl groups, alcohols, ethers, thioethers, amines, esters, amides and carboxylic acids, $R^3$ is selected from the group consisting of hydrogen and $C_1$–$C_6$ alkyl groups, and M is selected from the group consisting of hydrogen, alkaline metal ions, alkaline earth metal ions, ammonium salts, zinc salts and aluminum salts, compounds of formula (II):

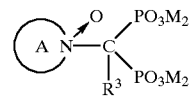

wherein circle A represents a nitrogen-containing heterocycle, $R_3$ is selected from the group consisting of: hydrogen and $C_1$–$C_6$ alkyl groups, and M is selected from the group consisting of hydrogen, alkaline metal ions, alkaline earth metal ions, ammonium salts, zinc salts and aluminum salts, compounds of formula (III):

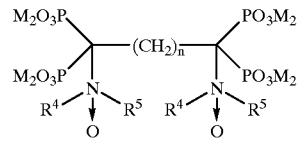

wherein n is an integer of from 1 to about 8, $R^4$ and $R^5$ are $C_1$–$C_6$ alkyl groups, and M is selected from the group consisting of hydrogen, alkaline metal ions, alkaline earth metal ions, ammonium salts, zinc salts and aluminum salts, and compounds of formula (IV):

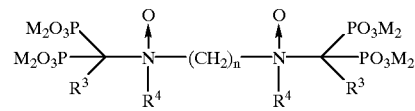

wherein n is an integer of from about 1 to about 8, $R^3$ is selected from the group consisting of: hydrogen and $C_1$–$C_6$ alkyl groups, $R^4$ is a $C_1$–$C_6$ alkyl group and M is selected from the group consisting of hydrogen, alkaline metal ions, alkaline earth metal ions, ammonium salts, zinc salts and aluminum salts.

Another aspect of the invention is a method for corrosion control using the above-described compounds.

An example of compounds represented by general formula III include those of general formula III wherein $R^4$ and $R^5$ are methyl groups, and n is 2.

An example of compounds represented by general formula IV include those of general formula IV wherein $R^3$ is hydrogen, $R^4$ is a methyl group and n is 2.

The Method

The phosphonic acid N-oxides described above are particularly advantageous for the control of the deposition of calcium carbonate scale in cooling water systems, especially for highly stressed cooling water systems such as high temperature and high hardness cooling water systems. The threshhold effect is exhibited whereby the formation of scale-forming salt crystals and adherence to heat transfer surfaces is exhibited at low treatment levels.

The precise dosage of N-oxide or salt suitable for controlling scale and corrosion depends, to some extent, on the nature of the aqueous system to be treated. A typical concentration range is from about 0.05 to about 10,000 ppm, with a preferred N-oxide concentration in amounts of from 0.1 to 500 ppm. More preferably from about 0.2 to about 100 ppm may be utilized. Most preferably, from about 0.2 to about 20 ppm may be utilized.

Moreover, the phosphonic acid N-oxides can be used in combination with other ferrous metal corrosion inhibitors, yellow metal corrosion inhibitors, scale inhibitors, dispersants, biocides and additives. Such combinations may exert synergistic effects in terms of corrosion inhibitors, scale inhibition, dispersancy and bacterium control.

Examples of other corrosion inhibitors which can be used in combination with the N-oxides are phosphorus-containing inorganic chemicals such as orthophosphates, pyrophosphates, polyphosphates; hydroxycarboxylic acids and their salts, such as gluconic, citric and tartaric acids; inorganic ions such as $Zn^{+2}$, $Ce^{+2}$, $MoO_6^{2-}$, $NO_3^-$ and $NO_2^-$; dibasic acids such as succinic and glutaric acid; nitrites; and phosphonates such as N,N-bis(methylene phosphonic acids) like EBO, as well as HEDP and PBTC.

Examples of the yellow metal corrosion inhibitors which can be used in combination with the N-oxides include benzotriazole, tolyltriazole, mercaptobenzothiazole and other azole compounds. Examples of other scale inhibitors include polyacrylates, polymethacrylates, copolymers of acrylic acid and methacrylate, copolymers of acrylic acid and acrylamide, poly(maleic acid), copolymers of acrylic acid and maleic acid, polyesters, poly(aspartic acid), functionalized poly(aspartic acid), terpolymers from acrylic acid or acrylamide, sulfomethylated acrylamide copolymers, HEDP(1-hydroxyethylidene-1,1-diphosphonic acid), PBTC (2-phosphonobutane-1,2,4-tricarboxylic acid), AMP(amino tri(methylene phosphonic acid), N,N-bis(methylene phosphonic acids) and mixtures thereof.

Examples of biocides which can be used in combination with the N-oxides include oxidizing biocides such as $Cl_2$, NaOCl, $Br_2$, NaOBr or non-oxidizing biocides such as glutaraldehyde, isothiazolines (5-chloro-2-methyl-4-isothiazoline-5-one and 2-methyl-4-isothiazoline-3-one), sulfamic acid stabilized bleach and sulfamic acid stabilized bromine.

To treat a cooling water system, the compounds may be added to the cooling tower basin or at any other location wherein good mixing can be achieved in a short time. If oxidizing biocides are to be added in conjunction with the N-oxides, addition points for these two components should be well separated to avoid chemical interactions. In all other cases, order of addition is inconsequential. The N-oxide may be added to the system at any convenient point. Moreover, the necessary amount of N-oxide may be added either periodically or continuously to the make-up water.

The term system as utilized herein is defined as any industrial process which utilizes water. The system could contain primarily aqueous fluids, or primarily non-aqueous fluids which also include water. Such systems are found as industrial processes which utilize boilers or cooling water towers. For example, the food processing industry is an industry which requires such a system.

The industrial process water may be cooling water. The scale may be calcium carbonate. Moreover, the scale may be derived from various system waters containing calcium sulfate, calcium phosphate, calcium silicate, magnesium carbonate, magnesium silicate, magnesium phosphate, barium carbonate, barium sulfate, barium silicate, barium phosphate and iron oxide. Additionally, the cooling water may contain a biocide.

Typical metal surfaces in cooling water systems which may be subjected to corrosion or scale deposition are made of stainless steel, mild steel and copper alloys such as brass among others.

The phosphonic acid N-oxides described above may be useful against scales in such diverse systems as oilfields and petroleum refineries, pulp and paper, and mining. These compounds may also have utility for iron clean up, as metal sequestering or chelating agents and as dispersants for clays.

The following examples are presented to describe preferred embodiments and utilities of the invention and are not meant to limit the invention unless otherwise stated in the claims appended hereto.

EXAMPLE 1

Diphosphonic acid starting materials were synthesized according to the general procedure described in U.S. Pat. No. 3,979,385. To 29.81 grams of N,N-dimethylaminomethane-1,1-diphosphonic acid (DMAMDP) in 25.0 grams of deionized water was added 34 grams of 50% NaOH. This resulted in a solution pH 9.7. Under cooling, hydrogen peroxide 19.28 grams (30%) was added. The solution was heated at 60° C. for 3 hours to afford a clear solution. $^{31}P$ NMR and $^{31}C$ NMR analyses indicated that all N,N-dimethylaminomethane-1,1-diphosphonic acid was converted into N,N-dimethylaminomethane-1,1-diphosphonic acid N-oxide (DMAMDPO).

EXAMPLE 2

To 6.00 grams of N-morpholinomethane-1,1-diphosphonic acid (MMDP) was added 12.0 grams of deionized water and 7.2 grams of 50% NaOH. This resulted a solution of pH 11.7. 10.42 grams of 30% hydrogen peroxide was added. The solution was stirred overnight to afford a clear solution. $^{31}P$ NMR and $^{3}c$ NMR analyses indicated that all N-morpholinomethane-1,1-diphosphonic acid was converted into N-morpholinomethane-1,1-diphosphonic acid N-oxide (MMDPO).

EXAMPLE 3

The following procedure was utilized to determine the calcium tolerance of phosphono group containing compounds. Two solutions were made up. The first was a 1000 mL of a 1000 ppm Ca solution (as $CaCO_3$) which was pH-adjusted to 9.0 by dropwise addition of dilute NaOH. The second was a 1000 ppm inhibitor solution also adjusted to pH 9.0 by dropwise addition of dilute NaOH. Into a double-walled flask with recirculating water at 140° F. was added 400 mls of the calcium solution. The inhibitor solution was then added to the calcium containing solution, which was magnetically stirred, at a rate of 1.0 mL/min with the solution transmittance recorded at a wavelength of 420 nm. A plot of % transmittance vs. inhibitor concentration gives a negative slope with the magnitude being an indication of how inhibitor precipitation is occurring. The ability of a potential calcium carbonate scale inhibitor to control deposit formation is dependent on the inhibitor's availability during scale formation. Inhibitor chemistries which are stable towards precipitation at high calcium ion concentrations in the calcium tolerance test have a wider application range than less calcium tolerant treatments. As shown in Table I, the representative N-oxides MMDPO and DMAMDPO of the instant invention display superior performance in calcium tolerance testing, as the 100% transmittance indicates that there is no precipitation at all.

TABLE I

Calcium Tolerance Comparison of Aminomethane-1,1-Diphosphonic Acid N-Oxides to Conventional Treatments

| Treatment | % Transmittance[5] |
|---|---|
| None | 100 |
| PBTC[1] | 94 |
| HEDP[2] | 85 |
| MMDPO[3] | 100 |
| DMAMDPO[4] | 100 |

[1] = 2-phosphonobutane-1,2,4-tricarboxylic acid
[2] = 1-hydroxyethane-1,1-diphosphonic acid
[3] = morpholinomethane-1,1-diphosphonic acid N-oxide synthesized according to the procedure of Example 2
[4] = N,N-dimethylaminomethane-1,1-diphosphonic acid N-oxide synthesized according to the procedure of Example 1
[5] = % transmittance after 100 ppm of inhibitor had been added. Initial 1000 ppm calcium solution (as $CaCO_3$) at pH 9.0 and 140° F.

EXAMPLE 4

The constant composition technique was used to evaluate relative compound effectiveness regarding crystal growth inhibition. This method uses seed crystals which are introduced into a supersaturated solution of the seed components and measures growth rates as titrants are consumed during the crystallization process.

The procedure was performed as follows. A supersaturated solution of calcium and carbonate was made in a double-walled glass cell with recirculating water to maintain a constant temperature. The addition of bicarbonate solution to the calcium solution was done slowly to insure metastability. The ionic strength was then adjusted with NaCl and the pH brought up to the desired value with dilute NaOH. Calcium carbonate seed crystals were then added. Characterization of the seed by scanning electron microscopy and triple point BET analysis indicated that the particles were normal rhombohedrons and had a specific surface area of 0.38 $m^2$/gm.

As the experiment ran, calcium and carbonate/bicarbonate titrants were fed to maintain a pH of 8.5. The titrant concentrations were chosen so that the feed rate is not too fast or slow and are corrected for the subsequent dilution of each by the other. The consumption of titrants was measured as a function of time to obtain the growth rate. Inhibitor was typically added after 5 mls of both titrants had been fed. Once the inhibitor is depleted, the growth rate increases exponentially. The exponential growth rate is extrapolated back to the x-axis, so that induction time can be determined.

Data was analyzed by multiplying the induction time by a normalization factor. This factor was obtained by dividing the slope observed just before inhibitor addition by an average slope determined from six replicate measurements. This operation compensated for different initial growth rates which are very dependent upon specific seed surface area and other environmental factors. The resulting data is a quantitative number (normalized induction time) describing the relative ability of a particular compound to inhibit crystal growth. Table II demonstrates that the representative N-oxides perform as well as PBTC and HEDP, and better than EBO and MOIPAMPO. However, as will be demonstrated by the next Example, an advantage of the use of N-oxides over PBTC and HEDP (having comparable inhibitory properties), is that the N-oxides are more stable in the presence of biocides such as chlorides than the conventional treatments.

TABLE II

Calcite Growth Inhibition for Aminomethane-1,1-Diphosphonic Acid N-Oxides and an Amine bis-methylenephosphonic Acids versus Conventional Treatments

| Treatment | Induction Time (min.)[8] |
|---|---|
| None | 0 |
| PBTC[1] | 550 |
| HEDP[2] | 650 |
| EBO[6] | 100 |
| MOIPAMPO[7] | 400 |
| MMDPO[3] | 570 |
| DMAMDPO[4] | 620 |

[1] = 2-phosphonobutane-1,2,4-tricarboxylic acid
[2] = 1-hydroxyethane-1,1-diphosphonic acid
[3] = morpholinomethane-1,1-diphosphonic acid N-oxide synthesized according to the procedure of Example 2
[4] = N,N-dimethylaminomethane-1,1-diphosphonic acid N-oxide synthesized according to the procedure of Example 1
[6] = hydroxyethyl bis(phosphonomethyl)amine N-oxide
[7] = methoxyisopropyl bis(phosphonomethyl)amine N-oxide
[8] = induction time is the time after seed addition and subsequent inhibitor addition (5 mls titrant) until the intrinsic growth rate is again observed, indicating inhibitor depletion

EXAMPLE 5

The stability of a potential inhibitor towards oxidation by biocides is an important factor with regard to performance in an actual cooling tower environment. In order to assess the relative stability of the phosphonic acid N-oxides, degradation to inorganic phosphate was measured in the presence of hypochlorite, as enumerated in Table III.

A synthetic water was made consisting of 400 ppm calcium, 200 ppm magnesium and 400 ppm M alkalinity, all as $CaCO_3$. The inhibitor was added at 25 ppm, as actives, prior to the bicarbonate to aid in preventing precipitation. Sodium hypochlorite, as a 5.25% bleach solution, was then added so that a nominal concentration of 40 ppm $Cl_2$ was present. The concentration was checked by a colorimetric method. Either the free residual chlorine or inorganic phosphate concentration could then be measured as a function of time to determine oxidation kinetics of the inhibitor. A lower measured $PO_4$ concentration indicates a greater stability for the inhibitor under cooling tower conditions. MMDPO and DMAMDPO do not degrade under these conditions, though the conventional treatments do.

TABLE III

Chlorine Stability Comparison of Substituted Aminomethane-1,1-Diphosphonic Acid N-oxides with those of Substituted Aminomethane-1,1-Diphosphonic Acids and Conventional Treatments

| Treatment[9] | $PO_4$ Concentration[10] |
|---|---|
| None | 0 |
| HEDP[2] | 8 |
| MMDP[11] | 14 |
| MMDPO[3] | 0 |
| DMAMDP[12] | 15 |
| DMAMDPO[4] | 0 |

[2] = 1-hydroxyethane-1,1-diphosphonic acid
[3] = morpholinomethane-1,1-diphosphonic acid N-oxide synthesized according to the procedure of Example 2
[4] = N,N-dimethylaminomethane-1,1-diphosphonic acid N-oxide synthesized according to the procedure of Example 1
[9] = 25 ppm of inhibitor exposed to 40 ppm chlorine bleach (OCl, as $Cl_2$) after 25 hrs.
[10] = inorganic $PO_4$ measured by colorimetric method
[11] = morpholinomethane-1,1-diphosphonic acid
[12] = N,N-dimethylaminomethane-1,1-diphosphonic acid Changes can be made in the composition, operation and arrangement of the method of the present invention described herein without departing from the concept and scope of the invention as defined in the following claims:

What is claimed is:

1. A method for preventing scale formation on metal surfaces in contact with scale-forming industrial water within an industrial system which comprises the step of treating said water with an effective scale-inhibiting amount of a water-soluble calcium tolerated and biocide stable 1,1-diphosphonic acid N-oxide selected from the group consisting of:

compounds of formula (I)

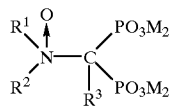

wherein $R^1$ and $R^2$ are selected from the group consisting of: straight chained alkyl groups, branched alkyl groups, alcohols, ethers, thioethers, amines, esters, amides and carboxylic acids, $R^3$ is selected from the group consisting of hydrogen and $C_1$–$C_6$ alkyl groups, and M is selected from the group consisting of hydrogen, alkaline metal ions, alkaline earth metal ions, ammonium salts, zinc salts and aluminum salts, compounds of formula (II):

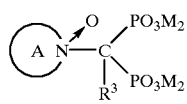

wherein circle A represents a nitrogen-containing heterocycle, $R_3$ is selected from the group consisting of: hydrogen and $C_1$–$C_6$ alkyl groups, and M is selected from the group consisting of hydrogen, alkaline metal ions, alkaline earth metal ions, ammonium salts, zinc salts and aluminum salts, compounds of formula (III):

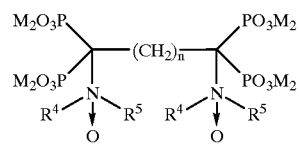

wherein n is an integer of from 1 to about 8, $R^4$ and $R^5$ are $C_1$–$C_6$ alkyl groups, and M is selected from the group consisting of hydrogen, alkaline metal ions, alkaline earth metal ions, ammonium salts, zinc salts and aluminum salts, and compounds of formula (IV):

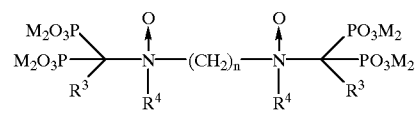

wherein n is an integer of from about 1 to about 8, $R^3$ is selected from the group consisting of: hydrogen and $C_1$–$C_6$ alkyl groups, $R^4$ is a $C_1$–$C_6$ alkyl group and M is selected from the group consisting of hydrogen, alkaline metal ions, alkaline earth metal ions, ammonium salts, zinc salts and aluminum salts.

2. The method of claim 1 wherein said industrial system is a cooling water tower and said industrial water is cooling water.

3. The method of claim 2 wherein said cooling water contains a biocide.

4. The method of claim 1 wherein said scale is calcium carbonate.

5. The method of claim 1 wherein said N-oxide of formula II is morpholinomethane-1,1-diphosphonic acid N-oxide and its water soluble salts.

6. The method of claim 1 wherein said N-oxide of formula I is N,N-dimethylaminomethane-1,1-diphosphonic acid N-oxide and its water-soluble salts.

7. A method for preventing corrosion on metal surfaces in contact with corrosive industrial water within an industrial system which comprises the step of treating said water with an effective corrosion inhibiting amount of a water-soluble calcium tolerant and biocide stable 1,1-diphosphonic acid N-oxide selected from the group consisting of:

compounds of formula (I):

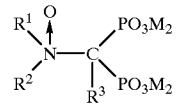

wherein $R^1$ and $R^2$ are selected from the group consisting of: straight chained alkyl groups, branched alkyl groups, alcohols, ethers, thioethers, amines, esters, amides and carboxylic acids, $R^3$ is selected from the group consisting of hydrogen and $C_1$–$C_6$ alkyl groups, and M is selected from the group consisting of hydrogen, alkaline metal ions, alkaline earth metal ions, ammonium salts, zinc salts and aluminum salts, compounds of formula (II):

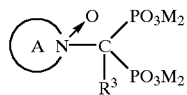

wherein circle A represents a nitrogen-containing heterocycle, $R_3$ is selected from the group consisting of: hydrogen and $C_1$–$C_6$ alkyl groups, and M is selected from the group consisting of hydrogen, alkaline metal ions, alkaline earth metal ions, ammonium salts, zinc salts and aluminum salts, compounds of formula (III):

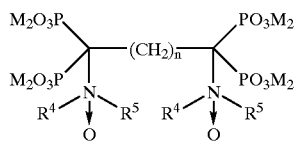

wherein N is an integer of from 1 to about 8, $R^4$ and $R^5$ are $C_1$–$C_6$ alkyl groups, and M is selected from the group consisting of hydrogen, alkaline metal ions, alkaline earth metal ions, ammonium salts, zinc salts and aluminum salts, and compounds of formula (IV):

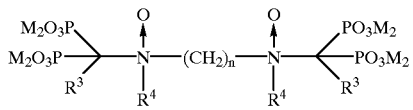

wherein n is an integer of from about 1 to about 8, $R^3$ is selected from the group consisting of: hydrogen and $C_1$–$C_6$ alkyl groups, $R^4$ is a $C_1$–$C_6$ alkyl group and M is selected from the group consisting of hydrogen, alkaline metal ions, alkaline earth metal ions, ammonium salts, zinc salts and aluminum salts.

8. The method of claim 7 wherein the industrial system is a cooling water tower.

9. The method of claim 7 wherein said N-oxide of formula II is morpholinomethane-1,1-diphosphonic acid N-oxide and its water-soluble salts.

10. The method of claim 7 wherein said N-oxide of formula I is N,N-dimethylaminomethane-1,1-diphosphonic acid N-oxide and its water-soluble salts.

11. A method for preventing scale formation on metal surfaces in contact with sale-forming industrial water within an industrial system which comprises the step of treating said water with an effective scale-inhibiting amount of a water-soluble 1,1-diphosphonic acid N-oxide selected from the group consisting of:

morpholinomethane-1,1-diphosphonic acid N-oxide and its water soluble salts and N,N-dimethylaminomethane-1,1-diphosphonic acid N-oxide and its water-soluble salts.

12. A method of preventing corrosion on metal surfaces in contact with corrosive industrial water within an industrial system comprising adding to the water with an effective corrosion-inhibiting amount of a water-soluble 1,1-diphosphonic acid N-oxide selected from the group consisting of:

morpholinomethane-1,1-diphosphonic acid N-oxide and its water soluble salts and N,N-dimethylaminomethane-1,1-diphosphonic acid N-oxide and its water-soluble salts.

* * * * *

UNITED STATES PATENT AND TRADEMARK OFFICE
CERTIFICATE OF CORRECTION

| | | |
|---|---|---|
| PATENT NO. | : 6,083,403 | Page 1 of 1 |
| DATED | : July 4, 2000 | |
| INVENTOR(S) | : Jiansheng Tang and Michael A. Kamrath | |

It is certified that error appears in the above-identified patent and that said Letters Patent is hereby corrected as shown below:

<u>Column 14,</u>
Line 15, surfaces in contact with sale-forming industrial within
"LETTERS PATENT SHOULD READ AS"
surfaces in contact with <u>scale</u>-forming industrial within Signed and Sealed this Seventh Day of August, 2001

*Attest:*

*Attesting Officer*

NICHOLAS P. GODICI
*Acting Director of the United States Patent and Trademark Office*